US009524523B2

(12) United States Patent
Sorlander

(10) Patent No.: US 9,524,523 B2
(45) Date of Patent: Dec. 20, 2016

(54) FAIL-SAFE SWITCH FOR MEDIA INSERTION SERVER IN A BROADCAST STREAM

(75) Inventor: Magnus Sorlander, La Jolla, CA (US)

(73) Assignee: VIGOR SYSTEMS INC., La Jolla, CA (US)

(*) Notice: Subject to any disclaimer, the term of this patent is extended or adjusted under 35 U.S.C. 154(b) by 127 days.

(21) Appl. No.: 13/261,609

(22) PCT Filed: Sep. 1, 2011

(86) PCT No.: PCT/US2011/050142
§ 371 (c)(1),
(2), (4) Date: May 13, 2013

(87) PCT Pub. No.: WO2012/031075
PCT Pub. Date: Mar. 8, 2012

(65) Prior Publication Data
US 2014/0040972 A1    Feb. 6, 2014

Related U.S. Application Data

(60) Provisional application No. 61/379,341, filed on Sep. 1, 2010.

(51) Int. Cl.
| | |
|---|---|
| *G06Q 30/06* | (2012.01) |
| *H04N 21/236* | (2011.01) |
| *H04L 29/08* | (2006.01) |
| *H04N 21/24* | (2011.01) |
| *H04N 21/81* | (2011.01) |
| *H04H 20/10* | (2008.01) |
| *H04H 60/11* | (2008.01) |
| *G06T 17/00* | (2006.01) |
| *H04N 7/10* | (2006.01) |

(52) U.S. Cl.
CPC ...... *G06Q 30/0633* (2013.01); *G06Q 30/0641* (2013.01); *G06T 17/00* (2013.01); *H04H 20/103* (2013.01); *H04H 60/11* (2013.01); *H04L 67/10* (2013.01); *H04N 7/104* (2013.01); *H04N 21/23614* (2013.01); *H04N 21/2404* (2013.01); *H04N 21/812* (2013.01)

(58) Field of Classification Search
CPC .......... H04N 7/10; H04Q 3/0079; H04Q 1/20; H04Q 2011/0081; H03K 17/00; H04L 45/28
USPC ..... 370/216–221; 348/61, 125, 180; 702/35, 702/57, 58; 725/32, 127
See application file for complete search history.

(56) References Cited

U.S. PATENT DOCUMENTS

| | | | | |
|---|---|---|---|---|
| 4,887,290 | A | * | 12/1989 | Dop et al. ........................ 379/33 |
| 6,118,498 | A | * | 9/2000 | Reitmeier ............. G06T 7/2013 348/725 |
| 7,924,883 | B2 | * | 4/2011 | Dravida et al. ............... 370/480 |

(Continued)

*Primary Examiner* — Fan Ng
*Assistant Examiner* — Rodrick Mak
(74) *Attorney, Agent, or Firm* — Park, Vaughan, Fleming & Dowler LLP

(57) ABSTRACT

A fail-safe mechanical switch is provided in a television broadcast environment which bypasses an advertisement insertion server in the event that a failure in the ad insertion server is detected. The broadcast stream from a satellite receiver where the stream originates thus continues uninterrupted to a remultiplexer for further distribution of the broadcast stream. The fail-safe switch cooperates with a processor which is capable of detecting a variety of failure events in the ad insertion server.

11 Claims, 10 Drawing Sheets

(56) References Cited

U.S. PATENT DOCUMENTS

| | | | |
|---|---|---|---|
| 8,239,913 B2* | 8/2012 | Munsell et al. | 725/144 |
| 2002/0065678 A1* | 5/2002 | Peliotis | H04N 7/163 725/35 |
| 2003/0169366 A1* | 9/2003 | Lenzi et al. | 348/461 |
| 2004/0028153 A1* | 2/2004 | Kien | H04L 27/0014 375/326 |
| 2004/0250272 A1* | 12/2004 | Durden | H04N 7/163 725/25 |
| 2006/0093038 A1* | 5/2006 | Boyce | 375/240.16 |
| 2006/0130112 A1* | 6/2006 | Stewart et al. | 725/115 |
| 2006/0233312 A1* | 10/2006 | Adams et al. | 379/21 |
| 2006/0277589 A1* | 12/2006 | Margis et al. | 725/135 |
| 2006/0291554 A1* | 12/2006 | Welles et al. | 375/240 |
| 2007/0008972 A1* | 1/2007 | Sifnatsch et al. | 370/392 |
| 2007/0053285 A1* | 3/2007 | Beer et al. | 370/222 |
| 2008/0131086 A1* | 6/2008 | Hutten | 386/109 |
| 2008/0209494 A1* | 8/2008 | Dravida et al. | 725/129 |
| 2009/0007194 A1* | 1/2009 | Brady et al. | 725/77 |
| 2009/0083811 A1* | 3/2009 | Dolce et al. | 725/93 |
| 2009/0083813 A1* | 3/2009 | Dolce et al. | 725/93 |
| 2009/0100496 A1* | 4/2009 | Bechtolsheim et al. | 725/147 |
| 2009/0245241 A1* | 10/2009 | Martin | 370/360 |
| 2011/0150006 A1* | 6/2011 | Unkel et al. | 370/503 |
| 2011/0251569 A1* | 10/2011 | Turner et al. | 604/318 |

* cited by examiner

FAIL-SAFE SWITCH FOR MEDIA INSERTION SERVER IN A BROADCAST STREAM

CROSS REFERENCE TO RELATED APPLICATIONS

This application claims the benefit under 35 U.S.C. §119 (e) to U.S. Provisional Application No. 61/379,341, filed Sep. 1, 2010. The disclosure of which is considered part of and is incorporated by reference in the disclosure of this application.

BACKGROUND

Field of the Invention

This invention relates to a device which inserts media content into a broadcast stream at a television station, and more specifically to a mechanical fail-safe switch with programming to detect a failure in the device and mechanically switch to bypass the failed device.

Description of the Related Art

An advertisement (ad) insertion server 102 operates in a television station environment between a satellite receiver 104 and a remultiplexer 106, as shown in the related art FIG. 1. In this illustration, the components are connected via a Cat 5 Ethernet cable 108. Due to the current configuration, if a failure occurs at the ad insertion server 102, the broadcast stream from the satellite receiver 104 will fail to reach the remultiplexer 106 and cause a signal failure.

SUMMARY

A fail-safe mechanical switch is provided in a television broadcast environment which bypasses an advertisement (ad) insertion server in the event that a failure in the ad insertion server is detected. The broadcast stream from a satellite receiver where the stream originates thus continues uninterrupted to a remultiplexer for further distribution of the broadcast stream. The fail-safe switch cooperates with a processor which is capable of detecting a variety of failure events in the ad insertion server.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. Specifically.

DETAILED DESCRIPTION

In the following detailed description, reference will be made to the accompanying drawings. The aforementioned accompanying drawings show by way of illustration, and not by way of limitation, specific embodiments and implementations consistent with principles of the present invention. These implementations are described in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

Figure 1:
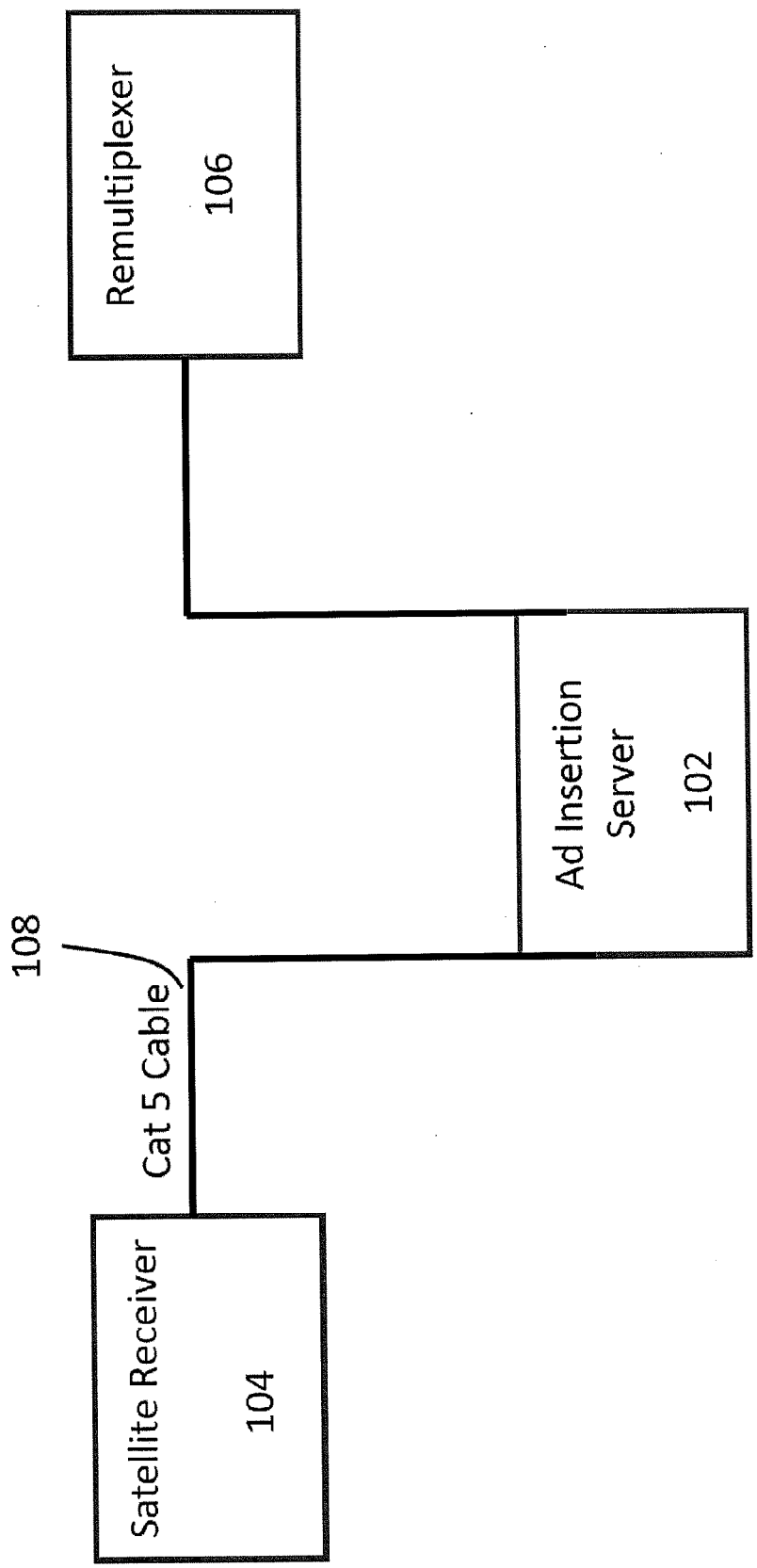
FIG. 1 illustrates a related art image of television broadcast configuration with an advertisement (ad) insertion server positioned between a satellite receiver and a remultiplexer.

The device disclosed herein provides a mechanical fail-safe switch in a television broadcasting environment which bypasses a failed component to ensure continuous provision of a broadcast stream. In the configuration illustrated in FIG. 1, a satellite receiver 104 at a local television station receives the originating signal from, for example, a network broadcast. In some environments, the broadcast stream from the satellite receiver 104 would pass uninterrupted to a remultiplexer 106 (remux) for further distribution to a television viewer. However, in the configuration illustrated in FIG. 1, the local television station employs an advertisement (ad) insertion server 102, which operates to place content in the existing broadcast stream. For example, the ad insertion server may insert local commercials during normal programming commercial breaks, or overlay logos and other information during regular programming.

However, the current configuration places the ad insertion server 102 between the satellite receiver 104 and the remux 106, such that in the event of a failure at the ad insertion server 102, the broadcast signal may not continue to the remux 106.

Figure 2:
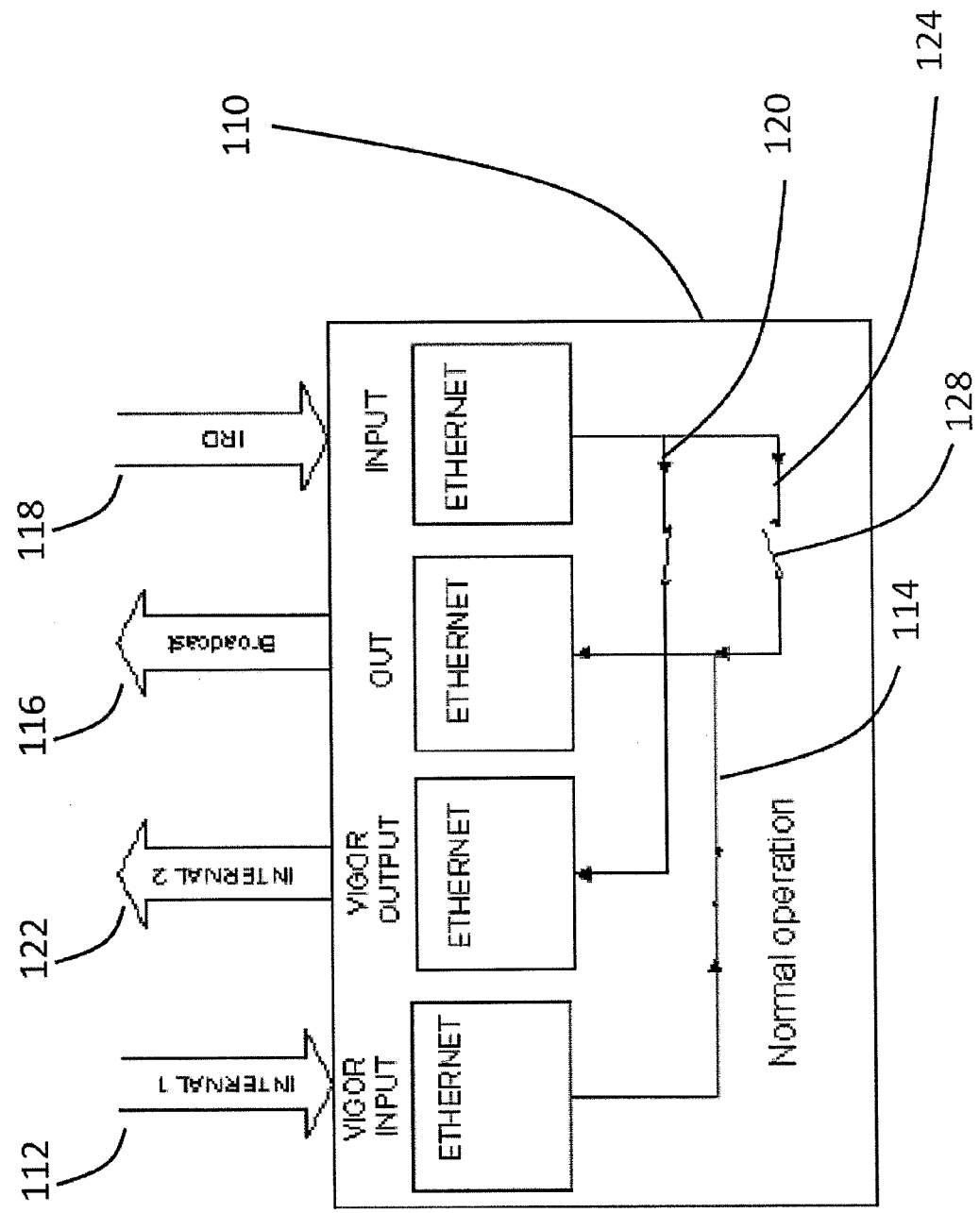
FIG. 2 illustrates a detailed configuration of a fail-safe switch operating in a normal, non-failure mode, according to one embodiment of the invention.

To remedy this problem, a mechanical fail-safe switch 110 has been developed, as shown in FIG. 2. FIG. 2 illustrates the operation of one embodiment of the fail-safe switch when no failure has occurred, i.e. normal operation. The fail-safe switch 110 is implemented within the ad insertion server 102 and provides for an internal input 112 of a signal from within the ad insertion server (not shown) which contains the original broadcast stream along with any inserted content. The internal input 112 travels along a path 114 within the switch 110, which eventually leads to an external output 116 which carries the signal out of the ad insertion server to the remux 106. An external input 118 provides the original broadcast stream directly from the satellite receiver (IRD in FIG. 2—"integrated receiver/decoder") and travels along a path 120 to an internal output 122, which sends the signal to the remaining components of the ad insertion server for insertion of content. Once the appropriate content has been inserted, the signal is received at the internal input 112, as described above. A bypass path 124 runs from the external input 118 to the external output 116, but during normal operation, this path is broken at position 128.

Figure 3:
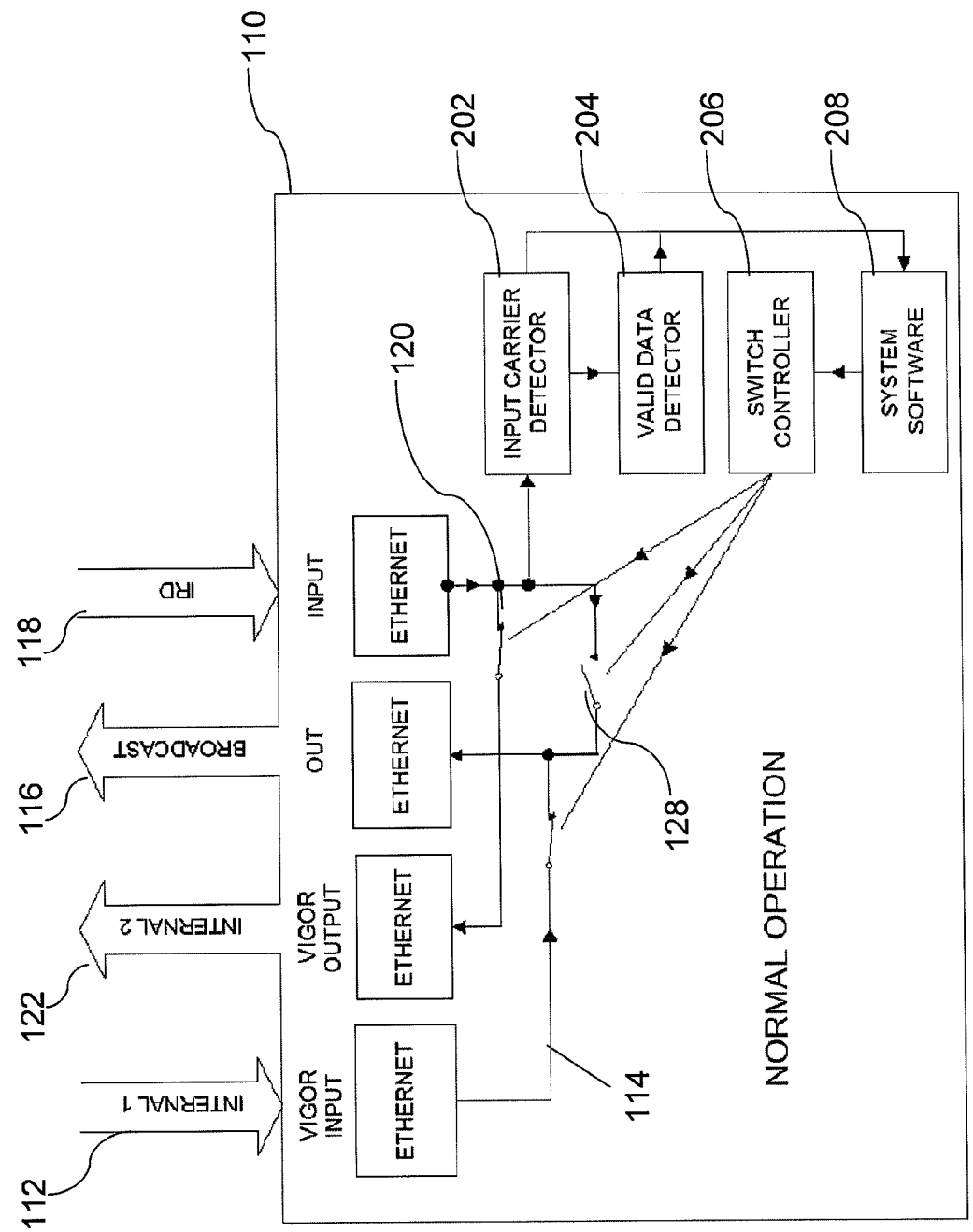
FIG. 3 illustrates a detailed configuration of a fail-safe switch operating in a normal, non-failure mode, according to another embodiment of the invention. Switches may be mechanical or digitally controlled electronic switches capable of passing analog or digital signals.

FIG. 3 illustrates the operation of another embodiment of the fail-safe switch when no failure has occurred, i.e. normal operation. The fail-safe switch 110 is implemented within the ad insertion server 102 and provides for an internal input 112 of a signal from within the ad insertion server (not shown) which contains the original broadcast stream along with any inserted content. The internal input 112 travels along a path 114 within the switch 110, which eventually leads to an external output 116 which carries the signal out of the ad insertion server to the remux 106. An external input 118 provides the original broadcast stream directly from the satellite receiver (IRD in FIG. 3—"integrated receiver/decoder") and travels along a path 120 to an internal output 122, which sends the signal to the remaining components of the ad insertion server for insertion of content. The external input 118 providing the original broad stream is also is also fed to an input carrier detector 202, which is then fed into a valid data detector 204 and the system software 208. The signal from the valid data detector 204 is also fed into the system software 208 for processing. The system software 208 controls the switch controller 206, which then actuates any of the switches to control broadcast output. Once the appropriate content has been inserted, the signal is received at the internal input 112, as described above. A bypass path 124 runs from the external input 118 to the external output 116, but during normal operation, this path is broken at position 128.

Figure 4:
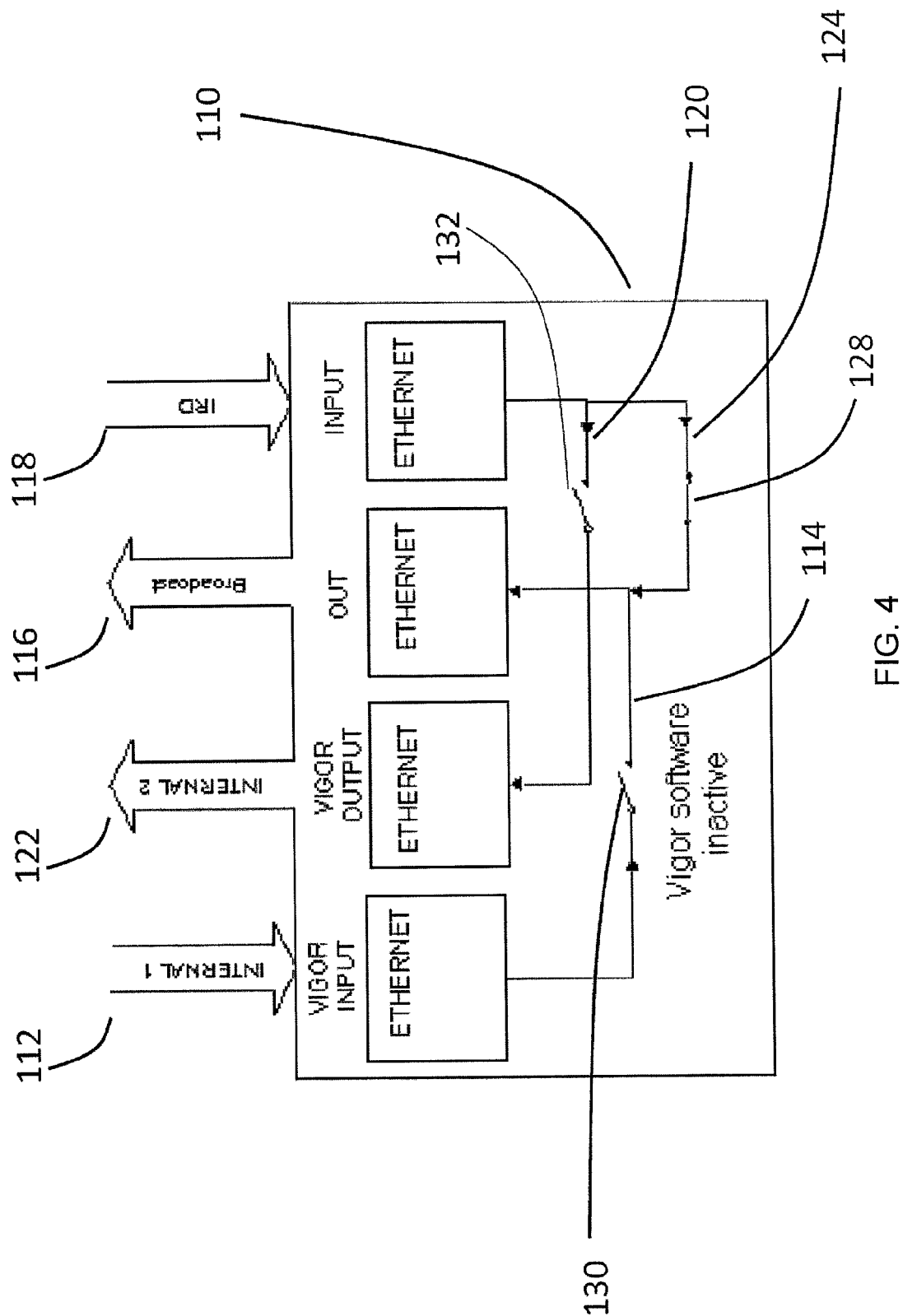
FIG. 4 illustrates a detailed configuration of the fail-safe switch operating in a failure mode, according to one embodiment of the invention.

A failure operation of the fail-safe switch 110 is illustrated in FIG. 4. In this embodiment, at least one failure occurs and is detected by a processor within the ad insertion server. The normal paths 114 and 120 of the ad insertion server are switched "off" at positions 130 and 132. As a result, the fail-safe switch 110 operates position 128 into an "on" position and complete the bypass path 124. The external input 118 now travels along bypass path 124 directly to external output 116, completely bypassing the internal input 122 of the ad insertion server. The original broadcast stream then continues to the remux without the content from the ad insertion server, but nevertheless fully intact.

Figure 5:
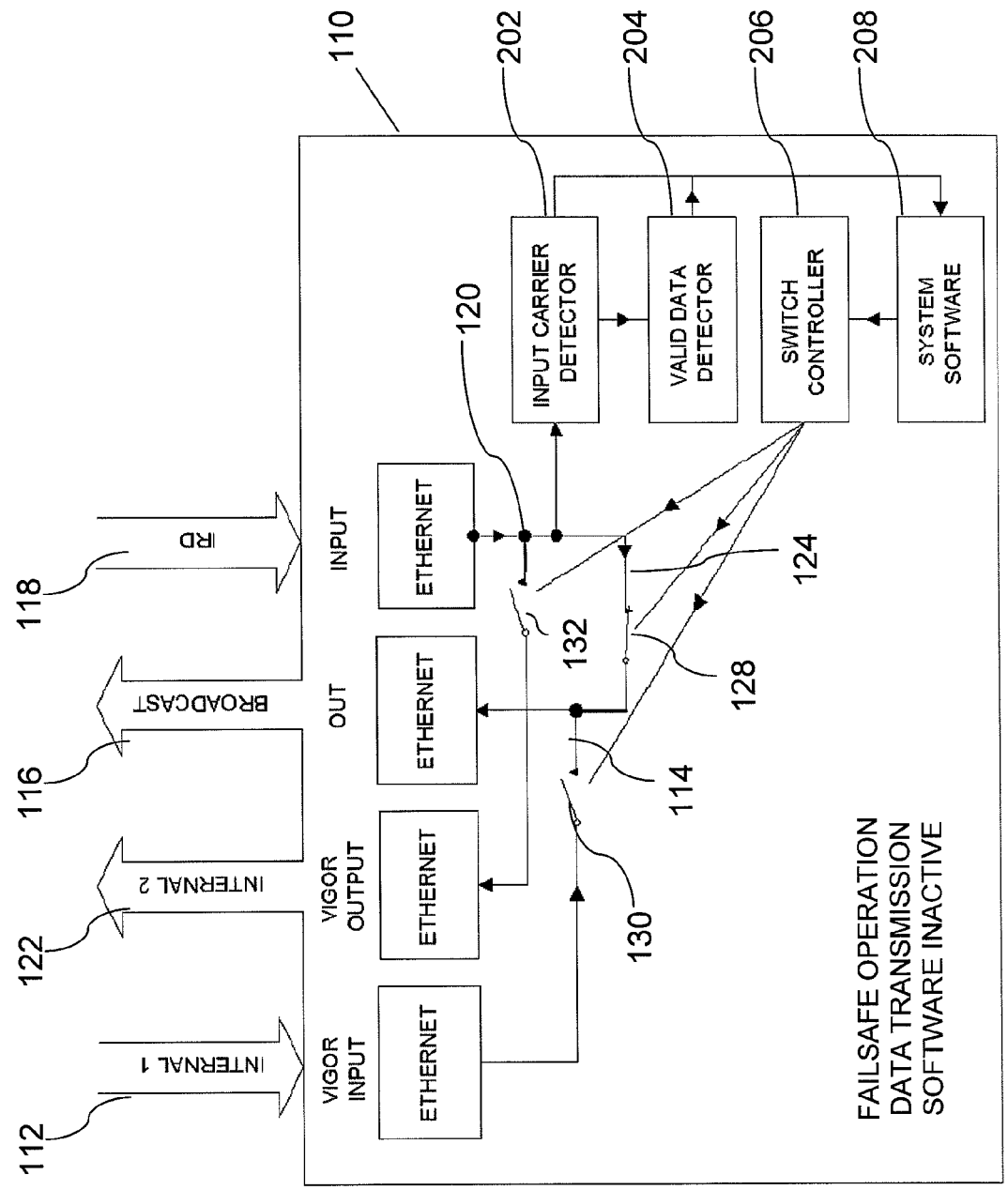
FIG. 5 illustrates a detailed configuration of the fail-safe switch operating in a failure mode, according to another embodiment of the invention. Switches may be mechanical or digitally controlled electronic switches capable of passing analog or digital signals.

FIG. 5 illustrates another embodiment of a failure operation of the fail-safe switch 110. In this embodiment, at least one failure occurs and is detected by a processor within the ad insertion server. As described above, the external input 118 providing the original broad stream is fed to an input carrier detector 202, which is then fed into a valid data detector 204 and the system software 208. The signal from the valid data detector 204 is also fed into the system software 208 for processing. The system software 208 controls the switch controller 206, which then actuates any of the switches to control broadcast output. The normal paths 114 and 120 of the ad insertion server are switched "off" at positions 130 and 132. As a result, the fail-safe switch 110 operates position 128 into an "on" position and complete the bypass path 124. The external input 118 now travels along bypass path 124 directly to external output 116, completely bypassing the internal input 122 of the ad insertion server. The original broadcast stream then continues to the remux without the content from the ad insertion server, but nevertheless fully intact.

Figure 6:
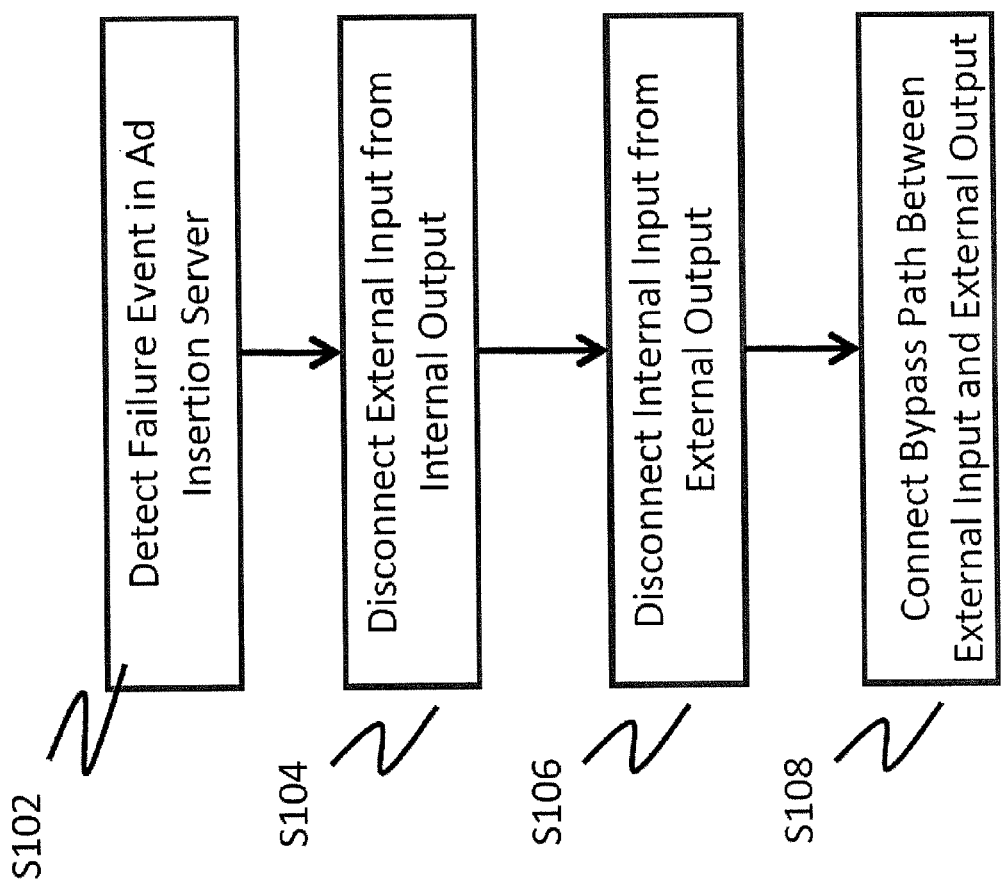
FIG. 6 illustrates a method of operating a fail-safe switch in an ad insertion server, according to one embodiment of the invention.

A method for operating a fail-safe switch in the event of a failure of the ad insertion server is illustrated in FIG. 6. In a first step S102, a failure event in the media insertion server is detected. In a second step S104, an external input is disconnected from an internal output. In a third step S106, an internal input is disconnected from an external output. In a fourth step S108, a bypass connection is connected between the external input and the external output.

The fail-safe switch therefore adequately bypasses the ad insertion server in the event of a failure. As mentioned above, numerous failure events may occur and are detected by a separate processor and memory running a computer program product programmed to monitor various functions of the ad insertion server for possible failures.

Figure 7:
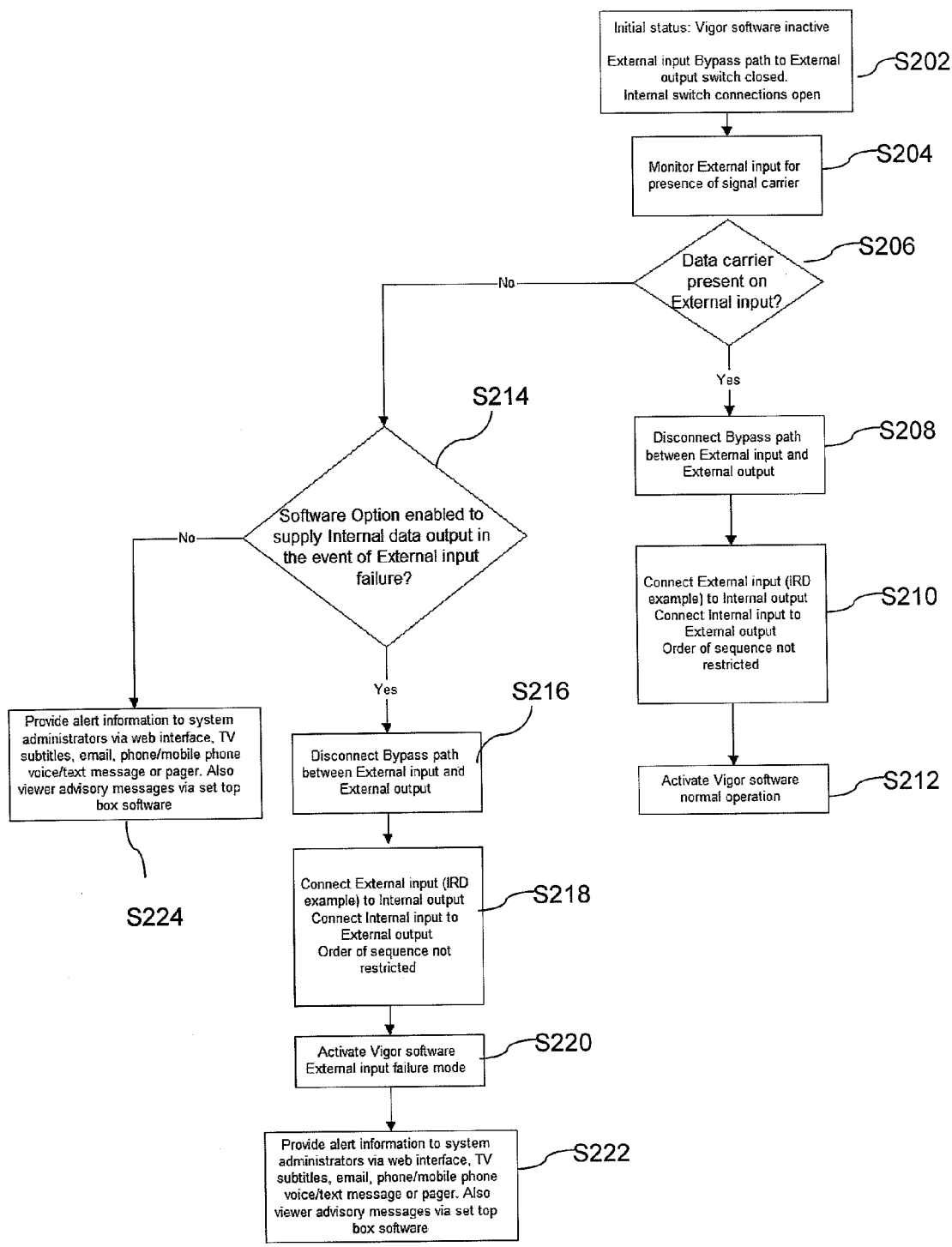
FIG. 7 illustrates the software initialization sequence control of the failsafe switch with external input data carrier detector additional to the ad server fail sequence. Thus, shown is a method of operating a fail-safe switch in an ad insertion server, according to another embodiment of the invention.

FIG. 7 illustrates another embodiment of the method for operating a fail-safe switch in the event of a failure of the ad insertion server. The software initialization sequence control of the failsafe switch with external input data carrier detector additional to the ad server fail sequence is shown.

In a first step S202, the initial status is that no failure is present. As such, the external input bypass path to the external output switch is open, while the internal switch connections are closed. In a second step S204, the system software monitors the external input for the presence of a signal carrier using input carrier detector 202 (not shown in FIG. 7). The system software then decides if the data carrier is present on the external input (S206) using the valid data detector 204 (not shown in FIG. 7).

If the system determines that the data carrier is present on the external input, the system disconnects (S208) the bypass path, or ensures that the bypass path is disconnected, between the external input and the external output. Thereafter, in step S210, the system connects the external input (for example, the IRD) to the internal output, and connects the internal input to the external output. It should be understood that the order of connections occurring in S210 are not restricted to those described herein, and may therefore occur simultaneously or subsequently in any order. In a further step, S212, normal operation of the television broadcast occurs.

If, in S210, the system determines that the data carrier is not present on the external input, then the system provides an option to supply alternative internal data output in the event of external input failure (S212). Thus, the fail-safe switch enables the broadcaster to provide a back-up if the original feed fails. In addition, the fail-safe switch of the invention also enables a broadcaster to preview the input data prior to activating failure mode.

If the option to supply alternative internal data output is not enabled, then the system merely provides alert information to system administrators via a web-based interface, TV subtitles, electronic mail (e-mail), phone/mobile text or voice message, and/or pager alert (S224) without activating external input failure mode. If the software option is enabled, then the system disconnects the bypass path between external input and external output at step S216. Thereafter, the system connects external input (for example, the IRD) to the internal output, and connects the internal input to the external output. As above, it should be understood that the order of connections occurring in S210 are not restricted to those described herein, and may therefore occur simultaneously or subsequently in any order. Thus, the system activates external input failure mode (S220), and provides alert information to system administrators via a web-based interface, TV subtitles, electronic mail (e-mail), phone/mobile text or voice message, and/or pager alert (S222). When in failure mode, the software may optionally supply alternative data/programming to the internal output.

Figure 8:
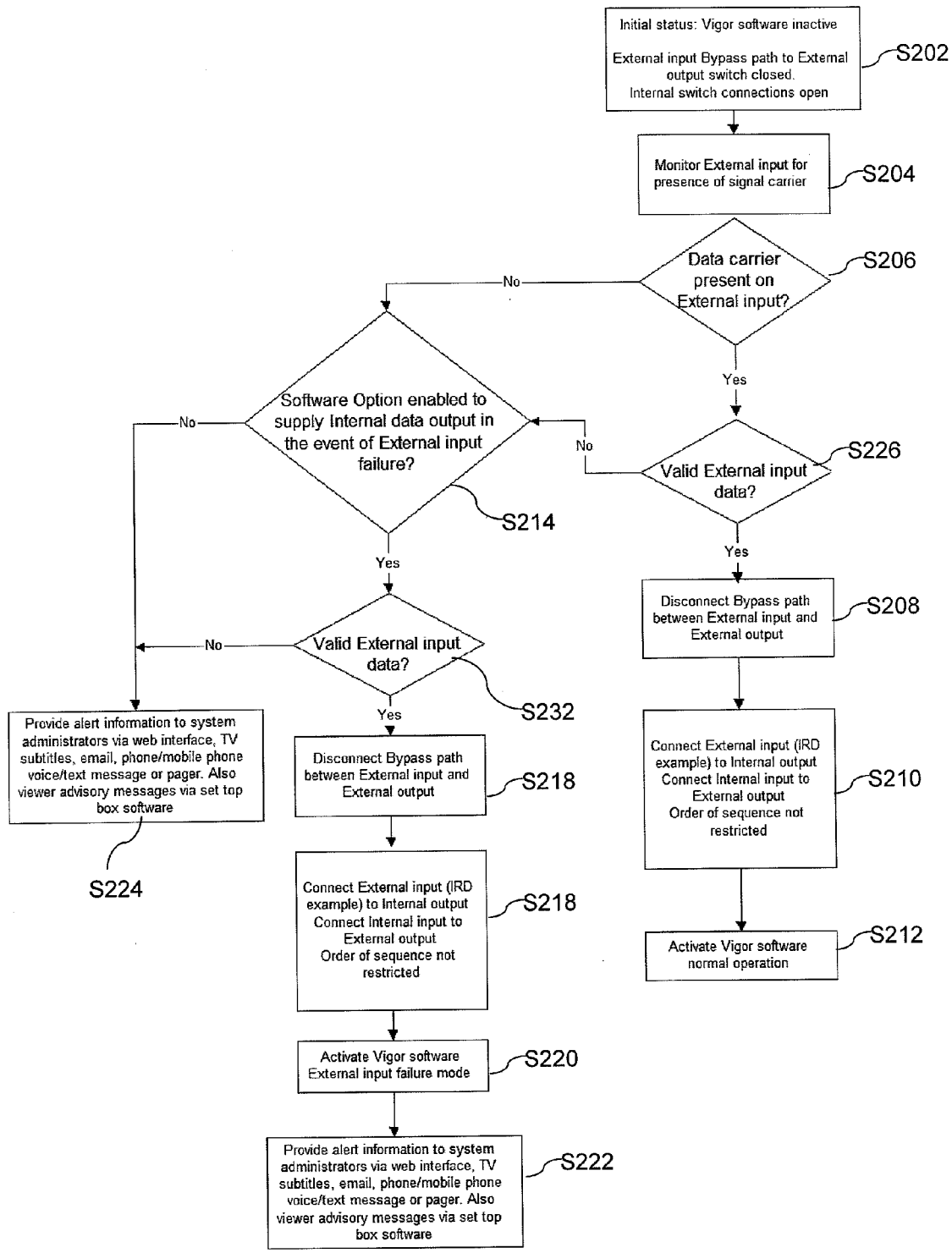
FIG. 8 illustrates the software initialization sequence control of the failsafe switch with external input data carrier detector and valid data detector additional to the ad server fail sequence. Thus, shown is a method of operating a fail-safe switch in an ad insertion server, according to another embodiment of the invention.

FIG. 8 illustrates another embodiment of the method for operating a fail-safe switch in the event of a failure of the ad insertion server. The software initialization sequence control of the failsafe switch with external input data carrier detector and valid data detector additional to the ad server fail sequence is shown. This embodiment is substantially similar to the method steps illustrated in FIG. 7. However, if the system determines in step S206 that the data carrier is present on the external input, the system thereafter determines if the external input data is valid in step S226. If the external input data is determined by the software to be valid, then the system disconnects (S208) the bypass path, or ensures that the bypass path is disconnected, between the external input and the external output. Thereafter, in step S210, the system connects the external input (for example, the IRD) to the internal output, and connects the internal input to the external output. It should be understood that the order of connections occurring in S210 are not restricted to those described herein, and may therefore occur simultaneously or subsequently in any order. In a further step, S212, normal operation of the television broadcast occurs.

If the system determines at step S206 that the data carrier is not present on the external input or if the system determines at step S226 that the external input data is not valid, then the system provides an option to supply alternative internal data output in the event of external input failure (S214).

If the software option to supply alternative internal data output is enabled, then the system determines at step S232 whether the external input data is valid. If the external input data is determined to be valid, then the system disconnects the bypass path between external input and external output at step S216. Thereafter, the system connects external input (for example, the IRD) to the internal output, and connects the internal input to the external output. As above, it should be understood that the order of connections occurring in S210 are not restricted to those described herein, and may therefore occur simultaneously or subsequently in any order. Thus, the system activates external input failure mode (S220), and provides alert information to system administrators via a web-based interface, TV subtitles, electronic mail (e-mail), phone/mobile text or voice message, and/or pager alert (S222). When in failure mode, the software may optionally supply alternative data/programming to the internal output.

However, if the system determines at step S214 that the option to supply alternative internal data output is disabled, or if the system determines at step S232 that the external input data is not valid, then the system will provide alert information to system administrators via a web-based interface, TV subtitles, electronic mail (e-mail), phone/mobile text or voice message, and/or pager alert (S216). When in failure mode, the software may optionally supply alternative data/programming to the internal output.

Figure 9:
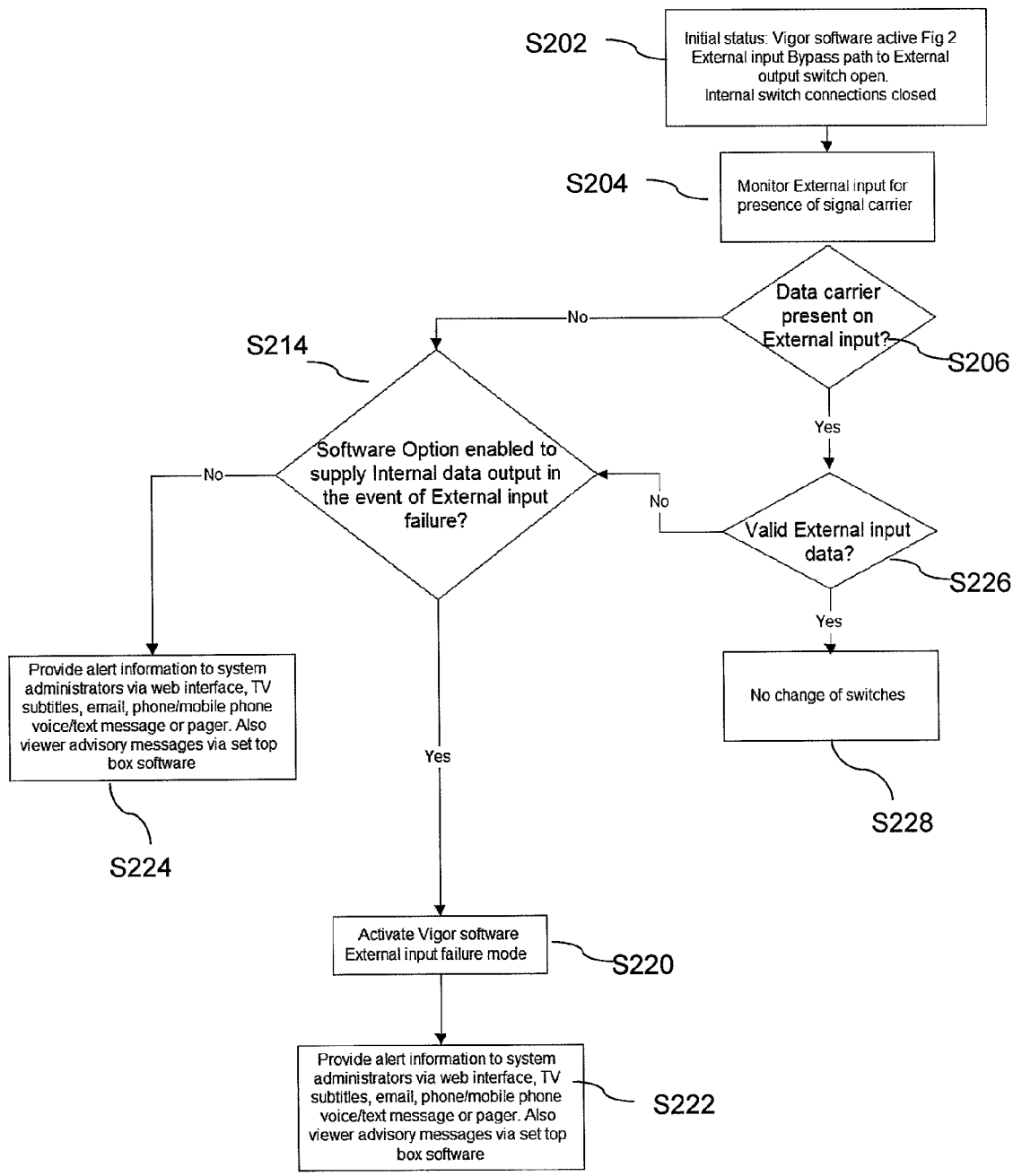
FIG. 9 illustrates the software initialization sequence control of the failsafe switch with external input data carrier detector and valid data detector additional to the ad server fail sequence. Thus, shown is a method of operating a fail-safe switch in an ad insertion server, according to another embodiment of the invention.

FIG. 9 illustrates another embodiment of the method for operating a fail-safe switch in the event of a failure of the ad insertion server. The software initialization sequence control of the failsafe switch with external input data carrier detector and valid data detector additional to the ad server fail sequence is shown. This embodiment is substantially similar to the method steps illustrated in FIGS. 7 and 8. However, if the external input data is determined in step S226 by the software to be valid, then no changes to the internal switches of fail-safe switch 110 are implemented. As in other embodiments, if the system determines at step S206 that the data carrier is not present on the external input or if the system determines at step S226 that the external input data is not valid, then the system provides an option to supply alternative internal data output in the event of external input failure (S214).

If the software option to supply alternative internal data output is enabled, then the system activates external failure mode at step S220 and provides alert information to system administrators via a web-based interface, TV subtitles, electronic mail (e-mail), phone/mobile text or voice message, and/or pager alert (S222). When in failure mode, the software may optionally supply alternative data/programming to the internal output.

If the system determines at step S214 that the option to supply alternative internal data output is disabled, then the system will provide alert information to system administrators via a web-based interface, TV subtitles, electronic mail (e-mail), phone/mobile text or voice message, and/or pager alert (S224).

Figure 10:
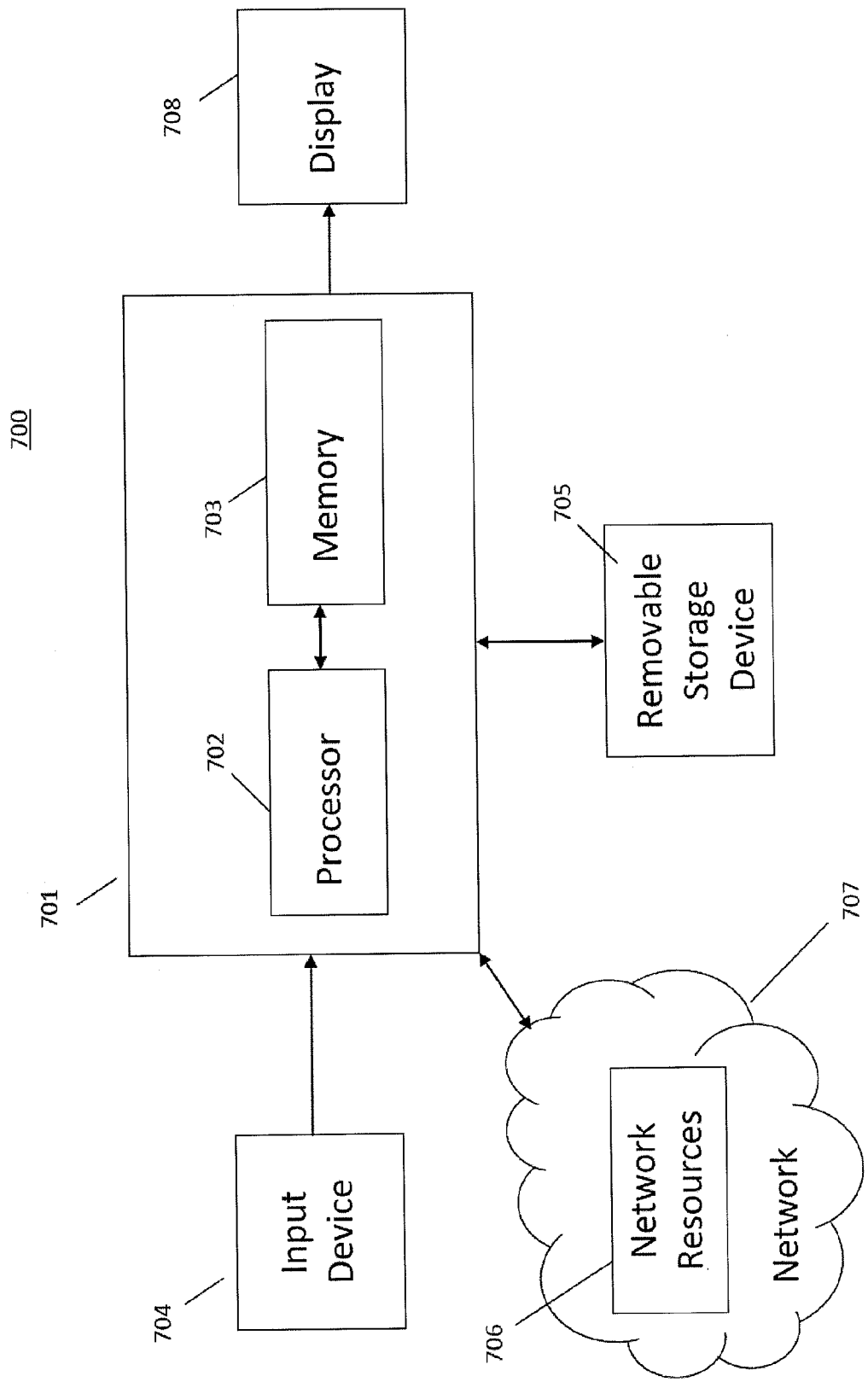
FIG. 10 is a block diagram of a computer system upon which the system may be implemented.

FIG. 10 is a block diagram that illustrates an embodiment of a computer/server system 700 upon which an embodiment of the inventive methodology may be implemented. The system 700 includes a computer/server platform 701 including a processor 702 and memory 703 which operate to execute instructions, as known to one of skill in the art. The term "computer-readable storage medium" as used herein refers to any tangible medium, such as a disk or semiconductor memory, that participates in providing instructions to processor 702 for execution. Additionally, the computer platform 701 receives input from a plurality of input devices 704, such as a keyboard, mouse, touch device or verbal command. The computer platform 701 may additionally be connected to a removable storage device 705, such as a portable hard drive, optical media (CD or DVD), disk media or any other tangible medium from which a computer can read executable code. The computer platform may further be connected to network resources 706 which connect to the Internet or other components of a local public or private network. The network resources 706 may provide instructions and data to the computer platform from a remote location on a network 707. The connections to the network resources 706 may be via wireless protocols, such as the 802.11 standards, Bluetooth® or cellular protocols, or via physical transmission media, such as cables or fiber optics. The network resources may include storage devices for storing data and executable instructions at a location separate from the computer platform 701. The computer interacts with a display 708 to output data and other information to a user, as well as to request additional instructions and input from the user. The display 708 may therefore further act as an input device 704 for interacting with a user.

What is claimed is:

1. A fail-safe switch in a media insertion server, comprising:
   an external input that receives an original broadcast stream from an external source, wherein the external input is connected to an internal output that sends the original broadcast stream to media insertion components in the media insertion server;
   an input carrier detector that receives a signal from the external input and determines whether a data carrier signal is present on the external input;
   a valid data detector that receives the signal from the input carrier detector and determines whether the data carrier signal on the external input contains valid data;
   wherein if the data carrier signal is not present or does not contain valid data:
      the fail-safe switch provides an option to send alternative programming in place of the original broadcast stream while enabling a previewing of the alternative programming; and
      the fail-safe switch determines whether the option to send alternative programming is enabled;
   if the option is enabled, the fail-safe switch facilitates sending the alternative programming in place of the original broadcast stream through the internal output to the media insertion components;
   an internal input that receives a processed broadcast stream, which comprises the original broadcast stream along with inserted content, from the media-insertion components, wherein the internal input is connected to an external output that sends the processed broadcast stream out of the media insertion server; and
   a bypass path connecting the external input to the external output;
   wherein the bypass path is not connected during normal operation of the media insertion server;
   wherein a failure event in the media insertion server causes a mechanical or digital disconnection of the external input from the internal output, a mechanical or digital disconnection of the internal input and the external output, and a mechanical or digital connection of the bypass path.

2. The fail-safe switch of claim 1, wherein the fail-safe switch is connected with a processor and a memory which trigger the fail-safe switch in the event of a failure event.

3. The fail-safe switch of claim 1, wherein the external input, internal output, internal input and external output are connected via Ethernet cables.

4. The fail-safe switch of claim 1, wherein the input carrier detector, the valid data detector, and the external input are connected via Ethernet cables.

5. A method for operating a fail-safe switch in a media insertion server, comprising:
   monitoring an external input, which receives an original broadcast stream from an external source, to determine whether a data carrier signal is present on the external input;
   if a data carrier signal is present on the external input, determining whether the data carrier signal contains valid data;
   if the data carrier signal is not present or does not contain valid data:
      providing an option to send alternative programming in place of the original broadcast stream while enabling a previewing of the alternative programming; and
      determining whether the option to send alternative programming is enabled;
   if the option is enabled, facilitating sending the alternative programming in place of the original broadcast stream through an internal output, which is directed to media insertion components in the media insertion server; and
   in response to detecting a failure event in the media insertion components,
      disconnecting the external input, which receives the original broadcast stream from the external source, from the internal output, which is directed to the media insertion components;
      disconnecting an internal input received from the media insertion components that contains a processed broadcast stream comprising the original broadcast stream along with inserted content, from an external output, which sends the processed broadcast stream out of the media insertion server; and
      connecting a bypass connection between the external input and the external output.

6. The method of claim 5, further comprising triggering the fail-safe switch upon detecting the failure event with a processor and a memory.

7. The method of claim 5, further comprising connecting the external input, the internal output, the internal input and the external output with Ethernet cables.

8. The method of claim 5, further comprising alerting a user regarding the failure event.

9. A computer program product for operating a fail-safe switch in a media insertion server, the computer program product embodied on a non-transitory computer-readable medium that when executed by a computer, performs a method comprising:
   monitoring an external input, which receives an original broadcast stream from an external source, to determine whether a data carrier signal is present on the external input;
   if a data carrier signal is present on the external input, determining whether the data carrier signal contains valid data;
   if the data carrier signal is not present or does not contain valid data:
      providing an option to send alternative programming in place of the original broadcast stream while enabling a previewing of the alternative programming; and
      determining whether the option to send alternative programming is enabled;
   if the option is enabled, facilitating sending the alternative programming in place of the original broadcast stream through an internal output, which is directed to media insertion components in the media insertion server; and
   in response to detecting a failure event in the media insertion components,
      disconnecting the external input, which receives the original broadcast stream from the external source, from the internal output, which is directed to the media insertion components;
      disconnecting an internal input received from the media insertion components that contains a processed broadcast stream comprising the original broadcast stream along with inserted content, from an external output, which sends the processed broadcast stream out of the media insertion server; and connecting a bypass connection between the external input and the external output.

10. The computer program product of claim 9, wherein the method further comprises triggering the fail-safe switch upon detecting the failure event with a processor and a memory.

11. The computer program product of claim 9, wherein the method further comprises connecting the external input, the internal output, the internal input and the external output with Ethernet cables.

* * * * *